(12) United States Patent
Zhang et al.

(10) Patent No.: US 11,188,700 B2
(45) Date of Patent: Nov. 30, 2021

(54) POWER DEVICE AND RESISTANCE SIMULATION METHOD THEREFOR, AND POWER DEVICE SIMULATION TOOL

(71) Applicant: CSMC TECHNOLOGIES FAB2 CO., LTD., Wuxi (CN)

(72) Inventors: Nan Zhang, Wuxi (CN); Jing Zhou, Wuxi (CN); Hao Wang, Wuxi (CN); Zhan Gao, Wuxi (CN); Maoqian Zhu, Wuxi (CN); Cheng Zhou, Wuxi (CN); Zhijin Li, Wuxi (CN); Lin Wu, Wuxi (CN); Shuming Guo, Wuxi (CN); Yong Huang, Wuxi (CN)

(73) Assignee: CSMC TECHNOLOGIES FAB2 CO., LTD., Jiangsu (CN)

( * ) Notice: Subject to any disclaimer, the term of this patent is extended or adjusted under 35 U.S.C. 154(b) by 0 days.

(21) Appl. No.: 17/053,550

(22) PCT Filed: Aug. 15, 2019

(86) PCT No.: PCT/CN2019/100683
§ 371 (c)(1),
(2) Date: Nov. 6, 2020

(87) PCT Pub. No.: WO2020/038268
PCT Pub. Date: Feb. 27, 2020

(65) Prior Publication Data
US 2021/0240898 A1    Aug. 5, 2021

(30) Foreign Application Priority Data
Aug. 22, 2018  (CN) .......................... 201810961688.8

(51) Int. Cl.
*G06F 30/367*    (2020.01)
*G06F 30/392*    (2020.01)
*G06F 119/06*    (2020.01)

(52) U.S. Cl.
CPC .......... *G06F 30/367* (2020.01); *G06F 30/392* (2020.01); *G06F 2119/06* (2020.01)

(58) Field of Classification Search
USPC ......................................................... 716/120
See application file for complete search history.

(56) References Cited

U.S. PATENT DOCUMENTS 5,448,083 A * 9/1995 Kitagawa ............ H01L 29/7394
257/133
6,330,977 B1   12/2001 Hass et al.
(Continued)

FOREIGN PATENT DOCUMENTS

CN    102175919    9/2011
CN    102291003    12/2011
(Continued)

OTHER PUBLICATIONS

PCT International Search Report (with English translation) and Written Opinion for corresponding PCT Application No. PCT/CN2019/100683, dated Nov. 12, 2019—8 pages.

*Primary Examiner* — Mohammed Alam
(74) *Attorney, Agent, or Firm* — Dority & Manning, P.A.

(57) ABSTRACT

The present application relates to a resistance simulation method for a power device, comprising: establishing an equivalent resistance model of a power device, wherein the connection relationship of N fingers is equivalent to N resistors $R_b$ connected in parallel, input ends of adjacent resistors $R_b$ are connected by means of a resistor $R_a$, output ends of adjacent resistors $R_b$ are connected by means of a resistor $R_c$, $$R_a = \frac{1}{N}R_0, R_c = \frac{1}{N}R_1,$$

(Continued)

and $R_b = R_{DEV} * N + R_S + R_D$, wherein $R_0$ and $R_1$ are respectively resistances of a source metal strip and a drain metal strip, $R_S$ is a metal resistor of a first intermediate layer connecting one source region to the source metal strip, $R_D$ is a metal resistor of a second intermediate layer connecting one drain region to the drain metal strip, and $R_{DEV}$ is the channel resistance of the power device; and calculating the resistance of the equivalent resistance model as the resistance of the power device.

15 Claims, 3 Drawing Sheets

(56) References Cited

U.S. PATENT DOCUMENTS

| | | | |
|---|---|---|---|
| 2002/0005549 A1* | 1/2002 | Saito | H01L 29/32 257/328 |
| 2006/0107246 A1* | 5/2006 | Nakamura | G06F 30/36 716/113 |
| 2006/0150132 A1* | 7/2006 | Gupta | G03F 7/70433 716/51 |
| 2012/0235241 A1* | 9/2012 | Barrow | H01L 27/0207 257/368 |
| 2014/0019930 A1 | 1/2014 | Yuh et al. | |
| 2015/0242008 A1 | 8/2015 | Beckman | |
| 2016/0079378 A1 | 3/2016 | Scuderi | |

FOREIGN PATENT DOCUMENTS

| | | |
|---|---|---|
| CN | 103779392 | 5/2014 |
| CN | 106601691 | 4/2017 |
| CN | 107679261 | 2/2018 |

\* cited by examiner

S110
establishing an equivalent resistance model of the power device according to a connection relationship of the finger structures.

S120
calculating a resistance of the equivalent resistance model, a resistance of the power device is the resistance of the equivalent resistance model.

POWER DEVICE AND RESISTANCE SIMULATION METHOD THEREFOR, AND POWER DEVICE SIMULATION TOOL

CROSS REFERENCE TO RELATED APPLICATIONS

This application claims priority to Chinese patent application No. 201810961688.8, filed on Aug. 22, 2018, and entitled "POWER DEVICE AND RESISTANCE SIMULATION METHOD THEREFOR, AND POWER DEVICE SIMULATION TOOL", the entirety of which is incorporated herein by reference.

TECHNICAL FIELD

The present disclosure relates to the field of semiconductor, and in particular to a power device and a simulation method for a resistance thereof, and a simulation tool for a power device.

BACKGROUND

Due to an influence of parasitic parameters, the actual output result of a device has a certain deviation from the effect under an ideal state. Therefore, when designing the device, it is generally necessary to use a simulation tool to simulate the layout of the device at the beginning of the designing, so as to find and correct problems in time before manufacturing the device. In this way, time and cost for designing the device can be saved. Since the parasitic resistance will change as the specific structure of the device changes, it is difficult to acquire an accurate value of the parasitic resistance. At present, there are two simulation methods considering the parasitic parameters. One is to estimate the parasitic parameters corresponding to the device of this size according to design experience, and substitute the parasitic parameters into the simulation; the other is to use a simulation tool such as LPE (Layout Parameter Extraction) tool to automatically extract the parasitic parameters in the layout after the layout design is completed, and substitutes them into post-simulation. The parasitic parameters of the device acquired by these two methods are not accurate, which makes the simulation result deviate greatly from the actual effect of the device, especially when the channel on-resistance of the device itself is small, the parasitic resistance contributes a lot to the resistance of the entire device, and the deviation of extracting the parasitic resistance is large, which makes the final obtained product cannot meet the demand.

SUMMARY

According to various embodiments of the present disclosure, a power device and a simulation method for a resistance thereof, and a simulation tool for a power device are provided.

A simulation method for a resistance of a power device, the power device includes:

N finger structures, each of the finger structures includes a source region and a drain region;

a top metal layer, including a source metal strip and a drain metal strip located at a top layer; and an intermediate metal layer, including a first intermediate layer and a second intermediate layer, wherein the first intermediate layer connects each of the source regions to the source metal strip to lead out a common source, and the second intermediate layer connects each of the drain regions to the drain metal strip to lead out a common drain;

the simulation method for the resistance includes.

establishing an equivalent resistance model of the power device according to a connection relationship of the finger structures; wherein, the connection relationship of N fingers is equivalent to a parallel connection of N resistors $R_b$, current input terminals of adjacent resistors $R_a$ are connected to each other through a resistor $R_a$, current output terminals of adjacent resistors $R_b$ are connected to each other through a resistor $R_c$, the source is a current input terminal of a first resistor $R_b$, and the drain is a current output terminal of an Nth resistor $R_b$, $$R_a = \frac{1}{N}R_0, R_c = \frac{1}{N}R_1,$$

$R_b = R_{DEV}*N + R_S + R_D$, wherein, $R_0$ is a resistance of the source metal strip, $R_1$ is a resistance of the drain metal strip, $R_S$ is a metal resistance of the first intermediate layer connecting a source region to the source metal strip, $R_D$ is a metal resistance of the second intermediate layer connecting a drain region to the drain metal strip, and $R_{DEV}$ is a channel resistance of the power device; and calculating a resistance of the equivalent resistance model, a resistance of the power device is the resistance of the equivalent resistance model.

A simulation method for a power device, the power device includes:

N finger structures, each of the finger structures includes a source region and a drain region;

a top metal layer, including a source metal strip and a drain metal strip located at a top layer; and an intermediate metal layer, including a first intermediate layer and a second intermediate layer, wherein the first intermediate layer connects each of the source regions to the source metal strip to lead out a common source, and the second intermediate layer connects each of the drain regions to the drain metal strip to lead out a common drain; the simulation method for the power device includes:

step A: acquiring a resistance of the power device, and the method for acquiring the resistance of the power device includes:

establishing an equivalent resistance model of the power device according to a connection relationship of the finger structures; where, the connection relationship of N fingers is equivalent to a parallel connection of N resistors $R_b$, current input terminals of adjacent resistors $R_b$ are connected to each other through a resistor $R_a$, current output terminals of adjacent resistors $R_b$ are connected to each other through a resistor $R_c$, the source is a current input terminal of a first resistor $R_b$, and the drain is a current output terminal of an Nth resistor $R_b$, $$R_a = \frac{1}{N}R_0, R_c = \frac{1}{N}R_1,$$

$R_b = R_{DEV}*N + R_S + R_D$, where, $R_0$ is a resistance of the source metal strip, $R_1$ is a resistance of the drain metal strip, $R_S$ is a metal resistance of the first intermediate layer connecting a source region to the source metal strip, $R_D$ is a metal resistance of the second intermediate layer connecting a drain region to the drain metal strip, and $R_{DEV}$ is a channel resistance of the power device; and calculating a resistance of the equivalent resistance model, a resistance of the power device is the resistance of the equivalent resistance model;

step B: reading the resistance of the power device and calculating a parasitic resistance of the power device, wherein the parasitic resistance of the power device is equal to the channel resistance of the power device subtracted from the resistance of the power device; and step C: acquiring the parasitic resistance of the power device and performing pre-simulation on the power device according to the parasitic resistance of the power device.

A simulation tool, configured to perform simulation on a power device, the power device includes:

N finger structures, each of the finger structures includes a source region and a drain region;

a top metal layer, including a source metal strip and a drain metal strip located at a top layer; and an intermediate metal layer, including a first intermediate layer and a second intermediate layer, wherein the first intermediate layer connects each of the source regions to the source metal strip to lead out a common source, and the second intermediate layer connects each of the drain regions to the drain metal strip to lead out a common drain;

the simulation tool includes:

a parameterization unit, including an algorithm unit, the algorithm unit being configured to establish an equivalent resistance model of the power device according to a connection relationship of the N finger structures, wherein, the connection relationship of N fingers is equivalent to a parallel connection of N resistors $R_b$, current input terminals of adjacent resistors $R_a$ are connected to each other through a resistor $R_a$, current output terminals of adjacent resistors $R_b$ are connected to each other through a resistor $R_a$, the source is a current input terminal of a first resistor $R_b$, and the drain is a current output terminal of an Nth resistor $R_b$, $$R_a = \frac{1}{N}R_0, R_c = \frac{1}{N}R_1,$$

$R_b=R_{DEV}*N+R_S+R_D$, wherein, $R_0$ is a resistance of the source metal strip, $R_1$ is a resistance of the drain metal strip, $R_S$ is a metal resistance of the first intermediate layer connecting a source region to the source metal strip, $R_D$ is a metal resistance of the second intermediate layer connecting a drain region to the drain metal strip, and $R_{DEV}$ is a channel resistance of the power device; and the algorithm unit being further configured to calculate a resistance of the equivalent resistance model and acquire a parasitic resistance of the power device according to the resistance of the power device, wherein the parasitic resistance of the power device is equal to the channel resistance of the power device subtracted from the resistance of the power device; and a pre-simulation unit, configured to read the parasitic resistance of the power device and perform pre-simulation on the power device according to the parasitic resistance.

The details of one or more embodiments of the disclosure are set forth in the accompanying drawings and description below. Other features, purposes and advantages of the present disclosure will become apparent from the description, the accompanying drawings, and the claims.

BRIEF DESCRIPTION OF THE DRAWINGS

To better describe and illustrate embodiments and/or examples of the disclosure disclosed herein, reference can be made to one or more accompanying drawings. The additional details or examples used to describe the accompanying drawings should not be construed as limiting the scope of any of the disclosed disclosure, the presently described embodiments and examples, and the presently understood preferred mode of the disclosure.

DETAILED DESCRIPTION

In order to facilitate the understanding of the present disclosure, the present disclosure will be described more fully hereinafter with reference to the related accompanying drawings. Preferable embodiments of the present application are presented in the accompanying drawings. However, the present application may be embodied in many different forms and is not limited to the embodiments described herein. Rather, these embodiments are provided so that the disclosure of the present application will be more thorough and complete.

All technical and scientific terms used herein have the same meaning as commonly understood by one of ordinary skill in the art to which the present application applies, unless otherwise defined. The terms used in the specification of present disclosure herein are for the purpose of describing specific embodiments only and are not intended to limit the present disclosure. The term "and/or" used herein includes any and all combinations of one or more of the associated listed items.

In order to thoroughly understand the present application, detailed steps and/or detailed structures will be set forth in the following description, so as to explain the technical solutions proposed by the present application. Preferred embodiments of the present application are described in detail below, however in addition to these detailed description, the present application may have other embodiments.

Figure 1:
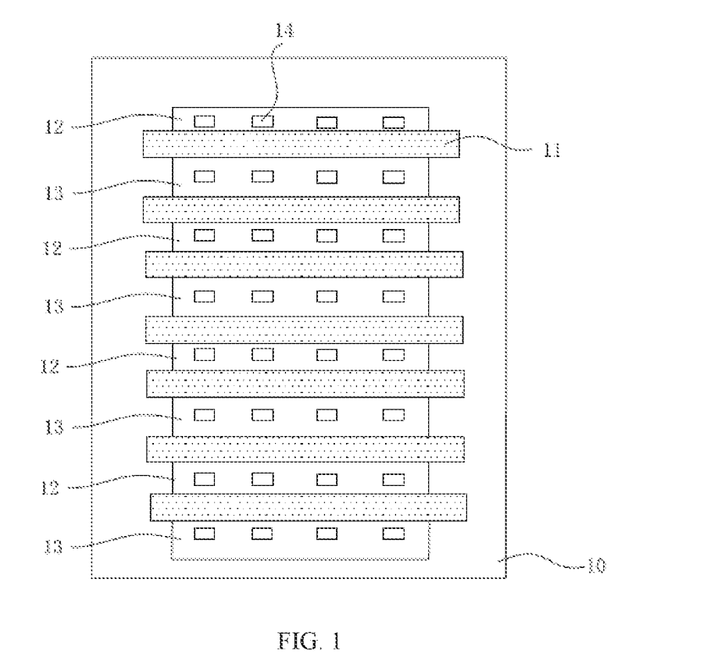
FIG. 1 is a schematic top view of a semiconductor substrate of a power device in an embodiment.
Figure 2:
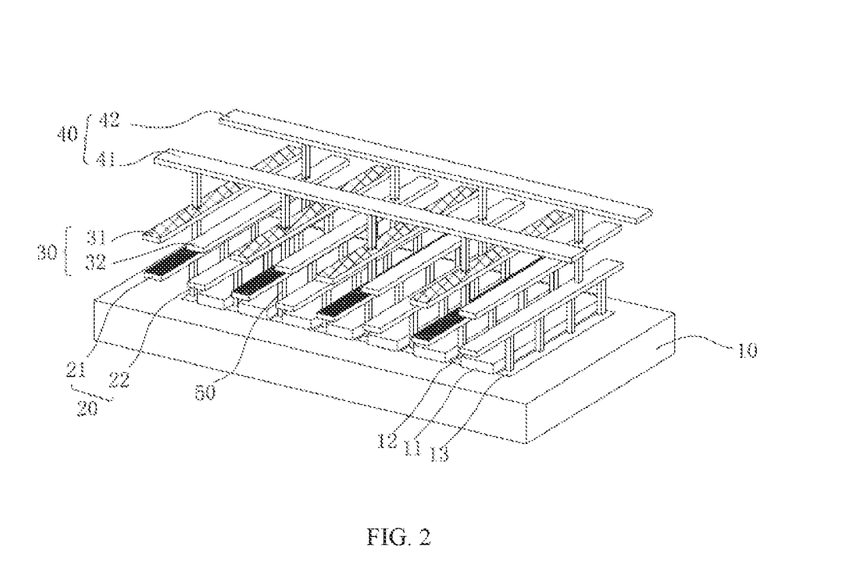
FIG. 2 is a three-dimensional structure diagram of a power device in an embodiment.

As shown in FIG. 1, a power device is manufactured on a semiconductor substrate. The power device includes a semiconductor substrate 10, and an active region is provided on the substrate 10. The active region includes a source region 12 and a drain region 13, and a gate 11 is provided between the source region 12 and the drain region 13. In the layout design, considering the layout restrictions, when a width-to-length ratio of a power transistor in an analog circuit is relatively large, the power transistor is generally made into finger structures, that is, a power transistor is split into a plurality of smaller power transistors in structure, and by leading out a source region of each of the finger structures from one same source and leading out a drain region of each of the finger structures from one same drain, these can be equivalent to one power transistor. In this solution, the semiconductor substrate has N finger structures thereon. Each of the finger structures includes a source region and a drain region. Correspondingly, the number of gates 11 is also N. The source region and the drain region are respectively defined with a contact hole 14 through which the active region can be electrically connected to the metal layer. As shown in FIG. 2, the power device further includes a metal layer. On the one hand, the metal layer is used to connect each of the source regions 12 and lead out a common source, and on the other hand, the metal layer is also used to connect each of the drain regions 13 and lead out a common drain. Each of the source regions is led out to a source metal strip 41 through a first intermediate layer, and each of the drain regions is led out to a drain metal strip 42 through a second intermediate layer. The intermediate metal layer includes at least one metal layer.

Figure 4:
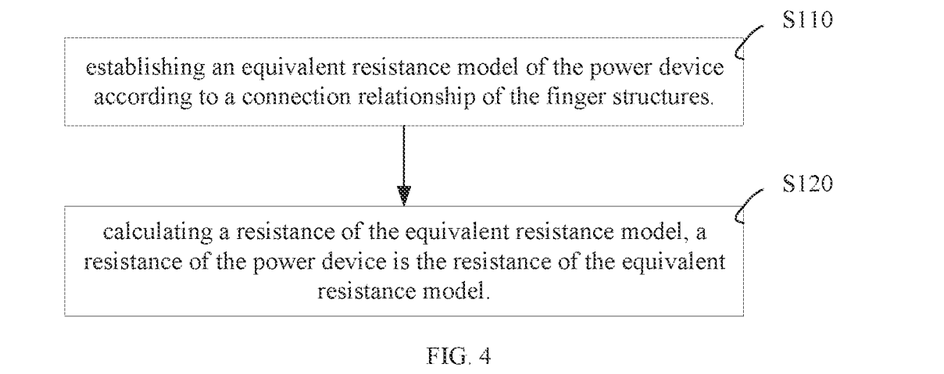
FIG. 4 is a flow chart of steps of a simulation method for a resistance of a power device involved in the present disclosure.

In this solution, as shown in FIG. 4, a simulation method for a parasitic resistance of the above power device includes the following steps:

Step S110: establishing an equivalent resistance model of the power device according to a connection relationship of the finger structures.

Firstly, the connection relationship of the layout of the power device is determined. Taking the metal layer having a structure of three metal layers to be described, as shown in FIG. 2, after the source regions 12 and the drain regions 13 are formed on the semiconductor substrate 10, a first metal layer 20 is formed on the semiconductor substrate, where the first metal layer 20 includes first metal strips 21 connected to the source regions 12, and further includes second metal strips 22 connected to the drain regions 13, the first metal strips 21 and the second metal strips 22 are provided at intervals and are not connected to each other. Since there are a plurality of finger structures on the substrate, there are a plurality of source regions and a plurality of drain regions. In the first metal layer, a plurality of first metal strips 21 need to be provided, and each of the source regions is connected to one of the first metal strips. Meanwhile, a plurality of second metal strips 22 need to be provided, and each of the drain regions is connected to one of the second metal strips, thereby achieving an electrical connection between the first metal layer 20 and the active region in the semiconductor substrate 10. A second metal layer 30 is then formed on the first metal layer 20. The second metal layer 30 includes third metal strips 31 and fourth metal strips 32. The third metal strips 31 and the first metal strips 21 are connected in a one-to-one correspondence. That is, the second metal layer 30 also includes a plurality of third metal strips 31, and one third metal strip 31 is correspondingly connected to one first metal strip 21. Similarly, the fourth metal strips 32 and the second metal strips 22 are connected in a one-to-one correspondence. That is, the second metal layer 30 also includes a plurality of fourth metal strips 32, and one fourth metal strip 32 is correspondingly connected to one second metal strip 22, thereby achieving an electrical connection between the first metal layer 20 and the second metal layer 30. Then, a topmost metal layer 40 is formed on the second metal layer. The topmost metal layer 40 includes a fifth metal strip 41 and a sixth metal strip 42. The fifth metal strip 41 is connected to each of the third metal strips 31 in the second metal layer 30, that is, the source regions 12 in the finger structures are connected to each other at the fifth metal strip 41 in the topmost metal layer, and the source can be led out through the fifth metal strip 41, the fifth metal strip 41 is the source metal strip. The sixth metal strip 42 is connected to each of the fourth metal strips 32 in the second metal layer 30, that is, the drain regions 13 in the finger structures are connected to each other at the sixth metal strip 42 in the topmost metal layer, and the drain can be led out through the sixth metal strip 42, the sixth metal strip 42 is the drain metal strip. It can be seen from the connection relationship that, the first metal strips 21, the third metal strips 31, and the fifth metal strip 41 constitute a source interconnection layer, the fifth metal strip 41 is the source metal strip, and the first metal strips 21 and the third metal strips 31 are the first intermediate layer connecting each of the source regions to the source metal strip. The second metal strips 22, the fourth metal strips 32, and the sixth metal strip 42 constitute a drain interconnection layer, and the sixth metal strip 42 is the drain metal strip, the second metal strips 22 and the fourth metal strips 32 are the second intermediate layer connecting each of the drain regions to the drain metal strip. An upper metal layer and a lower metal layer, and a metal layer and the semiconductor may be connected by a conductor 50. The structure of the power device is not limited to this embodiment. In this embodiment, the intermediate metal layer has a two-layer structure. In other embodiments, the intermediate metal layer may have a one-layer or multi-layer structure.

An equivalent resistance model is established according to the connection relationship of the above metal layers, where the connection relationship of N fingers is equivalent to a parallel connection of N resistors $R_b$, current input terminals of adjacent resistors $R_b$ are connected to each other through a resistor $R_a$, current output terminals of adjacent resistors $R_b$ are connected to each other through a resistor $R_c$, the source is the current input terminal of the first resistor $R_b$, and the drain is the current output terminal of the Nth resistor $R_b$, $$R_a = \frac{1}{N}R_0, R_c = \frac{1}{N}R_1,$$

$R_b=R_{DEV}*N+R_S+R_D$, where $R_0$ is the resistance of the source metal strip, and $R_1$ is the resistance of the drain metal strip. Generally, in layout design, the size of the source metal strip and the size of the drain metal strip are the same, and the resistances thereof are also the same, That is, therefore $R_0=R_1$, $R_a=R_c$, $R_S$ is the metal resistance of the first intermediate layer connecting a source region to the source metal strip, $R_D$ is the metal resistance of the second intermediate layer connecting a drain region to the drain metal strip, and $R_{DEV}$ is the channel resistance of the power device.

Each finger has its own channel resistance. When the size of the power device is determined, its channel resistance can be determined as $R_{DEV}$. In a specific implementation, the channel resistance can be obtained by means of pre-simulation. When the power device is split into N fingers, since the channel width of the power device is N times the channel width of a single finger, the channel resistance of each of the fingers is $R_G=N*R_{DEV}$. The source region of a single finger is connected to the source metal strip through the first intermediate layer, therefore the connection resistance of the source region of a single finger is $R_S$, $R_S$ is the metal resistance of the first intermediate layer, and the metal resistance of the metal layer can be calculated. For example, when the width and length of each metal strip and the sheet resistance of the metal layer are determined during layout design, the corresponding metal resistance can be obtained. In this solution, when the intermediate metal layer includes two layers, the metal resistance $R_S$ of the first intermediate layer is the parallel resistance of the first metal strip 21 and the third metal strip 31; the connection resistance of the drain region of a single finger strip is $R_D$, where $R_D$ is the metal resistance of the second intermediate layer. In this solution, when the intermediate metal layer includes two layers, the metal resistance $R_D$ of the second middle layer is the parallel resistance of the second metal strip 22 and the fourth metal strip 32, and an equivalent resistance $R_b$ is constituted by the metal resistance $R_S$ of the first intermediate layer, the metal resistance $R_D$ of the second intermediate layer, and the channel resistance of a single finger. According to the connection relationship of the power device, when the power device includes N fingers, it is equivalent to N resistors $R_b$ in parallel, the source is the current input terminal of the first resistor $R_b$, and the drain is the current output terminal of the Nth resistor $R_b$. Here, the first resistor and the Nth resistor refer to the headmost and backmost parallel resistors in the parallel relationship. At the same time, considering that when the source regions of the adjacent fingers are led out to the top source metal strip, there is a certain space between the connection positions on the source metal strip, and the metal in the space area will also have a metal resistance, the metal resistance is equivalent to $$R_a = \frac{1}{N}R_0.$$

Similarly, when the drain regions of the adjacent fingers are led out to the top drain metal strip, there is a certain space between the connection positions on the drain metal strip, and the metal in the space area will also have a metal resistance, the metal resistance is equivalent to $$R_c = \frac{1}{N}R_1.$$

Figure 3:
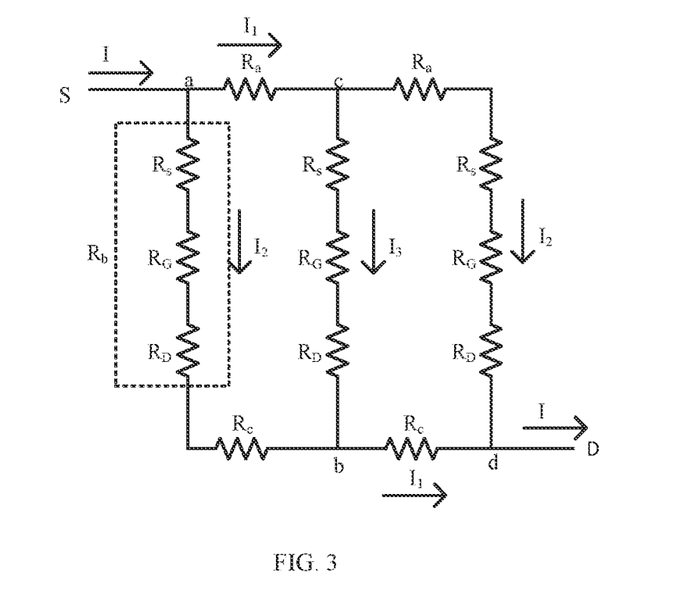
FIG. 3 is an equivalent resistance model diagram in an embodiment.

Therefore, the current input terminals of the adjacent resistors $R_b$ are connected to each other through the resistor $R_a$, and the current output terminals of the adjacent resistors $R_b$ are connected to each other through the resistor $R_c$, thus the establishment of the equivalent resistance model is finished. Take N=3 as an example, that is, a single power transistor is split into 3 finger structures, as shown in FIG. 3, which is a diagram of the equivalent resistance model of N=3, and the resistance value of each equivalent resistance in the figure can be calculated. In an embodiment, the resistance of the drain metal strip is the same as the resistance of the source metal strip, that is, $R_0=R_1$, therefore $R_a=R_c$.

Step S120: calculating a resistance of the equivalent resistance model, a resistance of the power device is the resistance of the equivalent resistance model.

After the equivalent resistance model is determined, since the resistance value of each equivalent resistance in the equivalent resistance model can be calculated, a total resistance of the equivalent model can also be calculated, and the total resistance is the resistance of the power device.

Taking N=3, $R_a=R_c$ as an example to illustrate the calculation process of the total resistance of the equivalent resistance model, as shown in FIG. 3, the total current input into the equivalent resistance model is I. The current relationships flowing through each branch can be obtained according to the symmetrical relationship of the equivalent resistance model. The current of branch ac is $I_1$, and the current of branch ab is $I_2$, the current of branch cb is $I_3$, the current of branch bd is $I_1$, the current of branch cd is $I_2$, and the total voltage from the source to the drain is $V_{DS}$. The following system of equations can be established:

$$I_2 = I - I_1; \quad (1)$$

$$I_3 = I_1 - I_2; \quad (2)$$

$$R_a * I_1 + R_b * I_3 = (R_c + R_b) * I_2; \quad (3)$$

$$R_a = R_c; \quad (4)$$

$$V_{DS} = R_a * I_1 + (R_a + R_b) * I_2; \quad (5)$$

$$R = \frac{V_{DS}}{1}; \quad (6)$$

According to the above system of equations, the total resistance of the equivalent resistance model can be obtained as $$R = \frac{2R_a^2 + 4R_a * R_b + R_b^2}{2R_a + 3R_b}.$$

Since $R_a \ll R_b$, the above result can be approximated as $$R \approx \frac{R_b}{3} + \frac{4R_a}{3}.$$

The above is the calculation process when N=3. Similarly, the total resistance with other values of N can also be calculated.

It should be noted that the source and drain metal leads also have a certain resistance, and this resistance has nothing to do with the connection relationship of the metal layers and is a constant. When calculating the resistance of the power device, this lead resistance can also be included.

In the simulation method for a parasitic resistance of a power device in this solution, the parasitic resistance caused by the metal layers is considered, which can make the obtained resistance value of the resistance of the power device more accurate. Since the reason why the parasitic resistance is produced is very complicated, the method of calculating the parasitic resistance is also very complicated, and it is difficult to obtain the accurate value of the parasitic resistance. Generally, the parasitic resistance is estimated by means of simulation. In this solution, the connection relationship of the metal layers of the power device is taken into consideration to establish the equivalent resistance model, and the total resistance of the equivalent model is equivalent to the resistance of the power device. Through tape-out verification, the resistance acquired by this method has a higher accurate, and the result is more reliable.

Figure 5:
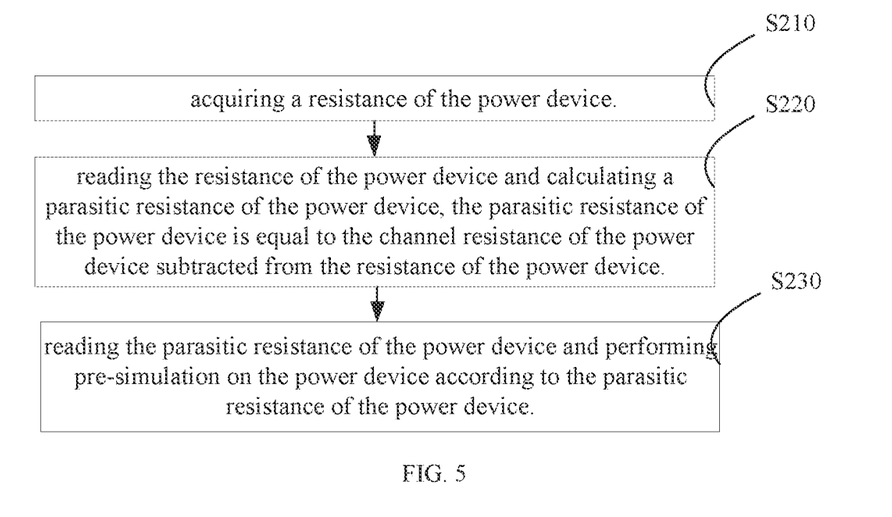
FIG. 5 is a flow chart of steps of a simulation method for a power device involved in this disclosure.

The application further discloses a simulation method for a power device. The power device includes N finger structures, each of the finger structures includes a source region and a drain region. The power device further includes metal layers, and the metal layers includes a source metal strip and a drain metal strip located at the top layer, the metal layers further include a first intermediate layer connecting each of the source regions to the source metal strip to lead out a common source and a second intermediate layer connecting each of the drain regions to the drain metal strip to lead out a common drain. The structure of the power device has been described in detail above, and will not be repeated here. As shown in FIG. 5, the simulation method includes:

Step S210: acquiring a resistance of the power device, and the method for acquiring the resistance of the power device includes:

Step S211: establishing an equivalent resistance model of the power device according to the connection relationship of the finger structures, where the connection relationship of N fingers is equivalent to a parallel connection of N resistors $R_b$, current input terminals of adjacent resistors $R_b$ are connected to each other through a resistor $R_a$, current output terminals of adjacent resistors $R_b$ are connected to each other through a resistor $R_c$, the source is the current input terminal of the first resistor $R_b$, and the drain is the current output terminal of the Nth resistor $R_b$, $$R_a = \frac{1}{N}R_0, R_c = \frac{1}{N}R_1,$$

$R_b = R_{DEV}*N + R_S + R_D$, where $R_0$ is the resistance of the source metal strip, $R_1$ is the resistance of the drain metal strip, $R_S$ is the metal resistance of the first intermediate layer connecting a source region to the source metal strip, $R_D$ is the metal resistance of the second intermediate layer connecting a drain region to the drain metal strip, and $R_{DEV}$ is the channel resistance of the power device.

Step S212: calculating a resistance of the equivalent resistance model, a resistance of the power device is the resistance of the equivalent resistance model.

In order to improve the accuracy of the simulation, parasitic parameters such as parasitic resistance of the device need to be considered during the simulation. In this solution, the total resistance of the power device including the parasitic resistance is directly acquired by establishing an equivalent resistance model. The acquiring process has been described in detail above and will not be repeated here.

Step S220: reading the resistance of the power device and calculating a parasitic resistance of the power device, the parasitic resistance of the power device is equal to the channel resistance of the power device subtracted from the resistance of the power device.

After the total resistance of the power device is acquired by the above method, the channel resistance of the power device is known, and the parasitic resistance of the power device is obtained by subtracting the channel resistance from the total resistance.

In order to facilitate the reading of the resistance value of the parasitic resistance, the resistance value of the parasitic resistance can be automatically displayed on the parameter display interface of the power device after the parasitic resistance is acquired.

Step S230: reading the parasitic resistance of the power device and performing pre-simulation on the power device according to the parasitic resistance of the power device.

Before performing the pre-simulation, the acquired parasitic resistance is written into a simulation netlist of the pre-simulation, that is, the simulation netlist further includes information of the parasitic resistance. In an embodiment, the simulation tool is a spectre simulation tool, and the parasitic resistance is specifically brought into a spectre netlist.

When the pre-simulation is performed without substituting the parasitic resistance of the device, the pre-simulation only obtains the on-channel resistance under the current size according to the size of the device and performs the simulation. Since the parasitic resistance is not considered, the accuracy of the pre-simulation is low. In this solution, since the parasitic resistance is substituted, the on-resistance used in the simulation is the superposition of the on-channel resistance and the parasitic resistance, therefore the accuracy of the simulation is high. The following table shows the comparison between the simulation results of the traditional pre-simulation, post-simulation, and this solution. The device of the same size is simulated. The total length of the device is 0.2 μm and the total width of the device is 48 mm. When designing the layout, the device is split into N finger strips. In the following table, they are the simulations of N taking 300, 160, and 100 respectively. In the following table, w represents the finger width, and the total width of the device=w*N. It can be seen from the following table that the result obtained by this solution is the closest to the actual value of the device, that is, the accuracy of the simulation of this solution is the highest.

| Method | Size | | |
| --- | --- | --- | --- |
| | w = 160 μm, N = 300 | w = 300 μm, N = 160 | w = 280 μm, N = 100 |
| Pre-simulation | 73.33 | 73.37 | 73.32 |
| Post-simulation | 117.9 | 88.7 | 77.6 |
| This solution | 125.5 | 108.5 | 129.7 |
| Actual value | 129 | 111 | 131 |

Since the parasitic resistance is determined by the layout of the device, before acquiring the parasitic resistance, the layout of the device needs to be determined first. In an embodiment, before acquiring the parasitic resistance of the power device, the method further includes: setting parameters of the power device and layout parameters, and generating a layout of the power device. Acquiring the parasitic resistance of the power device specifically refers to acquiring the parasitic resistance of the power device under the current layout. That is, after the layout of the power device is generated, by reading information of relevant parameters in the layout, and substituting the relevant parameters into the above calculation step of parasitic resistance, the resistance value of the parasitic resistance of the power device under the current parameters of the layout is obtained. In an embodiment, setting the parameters of the power device includes setting a length and a width of the power device, thereby determining the size of the power device, and setting the layout parameters includes setting the number of fingers and the structure of the metal layers of the power device. The size of a single finger in the layout can be determined according to the size of the device and the number of fingers. The total width of the device=the width of a single finger—the number of fingers. The more the number of fingers, the smaller the width-to-length ratio of the layout, therefore, the width-to-length ratio of the layout can be adjusted through a parameter setting unit. The metal layer includes a top metal layer and an intermediate metal layer. A part of the intermediate metal layer is connected to the source regions of each of the fingers and connected to each other at the top metal layer to lead out a common source, and the other part of the intermediate metal layer is connected to the drain regions of each of the fingers and is connected to each other at the top metal layer to lead out a common drain. The layer number of the intermediate metal layer can be set according to the actual situation. The more the layer number, the smaller the parasitic resistance, but the thicker the electrode lead region.

Before calculating the parasitic resistance of the power device, the method further includes inputting a circuit diagram of the power device, and generating a specific device layout corresponding to the circuit diagram based on the determined circuit diagram.

When the channel impedance of the power device is small, such as the total channel width of the power device is greater than 5 mm or the channel impedance is less than 500 mΩ, the parasitic impedance of the device will have a greater impact, and the deviation of the conventional simulation method will be large. In this case, the simulation method of this solution can be used for high-precision simulation. When the channel impedance of the power device is large, the impact of the parasitic impedance of the device is relatively small or ignored. In order to save simulation time, conventional methods can be used for simulation. Therefore, before using the simulation method of this solution for simulation, the method may further include determining the power device. When the total channel width of the power device is greater than 5 mm or the channel impedance is less than 500 mΩ, the simulation method of this solution is used to perform simulation on the power device.

The present disclosure further discloses a simulation tool, which is configured to perform simulation on a power device. The power device includes N finger structures, each of the finger structures includes a source region and a drain region. The power device further includes metal layers, and the metal layers includes a source metal strip and a drain metal strip located at the top layer, the metal layers further include a first intermediate layer connecting each of the source regions to the source metal strip to lead out a common source and a second intermediate layer connecting each of the drain regions to the drain metal strip to lead out a common drain. The structure of the power device has been described in detail above, and will not be repeated here.

Figure 6:
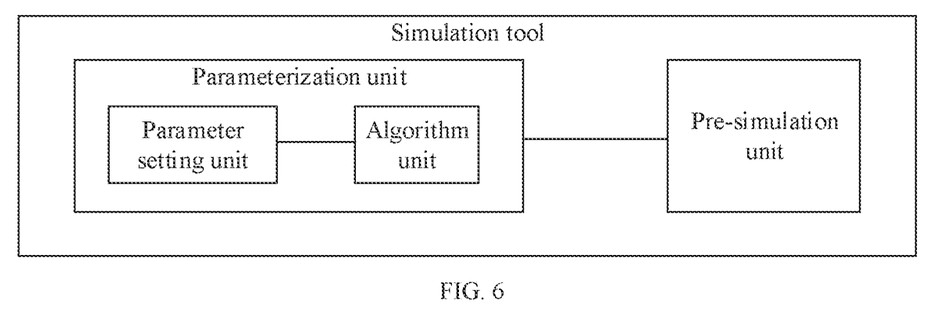
FIG. 6 is a schematic diagram of a simulation tool module in an embodiment.

As shown in FIG. 6, the simulation tool includes a parameterization unit and a pre-simulation unit. The parameterization unit includes an algorithm unit, the algorithm unit is configured to establish an equivalent resistance model of the power device according to a connection relationship of the finger structures; where, the connection relationship of N fingers is equivalent to a parallel connection of N resistors $R_b$, current input terminals of adjacent resistors $R_b$ are connected to each other through a resistor $R_a$, current output terminals of adjacent resistors $R_b$ are connected to each other through a resistor $R_c$, the source is a current input terminal of a first resistor $R_b$, and the drain is a current output terminal of an Nth resistor $$R_b, R_a = \frac{1}{N}R_0, R_c = \frac{1}{N}R_1,$$

$R_b = R_{DEV}*N + R_S + R_D$, where, $R_0$ is a resistance of the source metal strip, $R_c$ is a resistance of the drain metal strip, $R_S$ is a metal resistance of the first intermediate layer connecting a source region to the source metal strip, $R_D$ is a metal resistance of the second intermediate layer connecting a drain region to the drain metal strip, and $R_{DEV}$ is a channel resistance of the power device. The algorithm unit is further configured to calculate a resistance of the equivalent resistance model, a resistance of the power device is the resistance of the equivalent resistance model, and acquire a parasitic resistance of the power device according to the resistance of the power device, the parasitic resistance of the power device is equal to the channel resistance of the power device subtracted from the resistance of the power device. The pre-simulation unit is configured to read the parasitic resistance of the power device and perform pre-simulation on the power device according to the parasitic resistance.

Since the above simulation tool is provided with the parameterization unit, by using the parameterization unit, a parasitic resistance with high accuracy can be acquired. The pre-simulation unit in the simulation tool can read the parasitic resistance value in the parameterization unit, and perform pre-simulation according to the parasitic resistance, that is, compared with the conventional pre-simulation, the pre-simulation unit in this solution performs the simulation considering the parasitic resistance of the power device, therefore the accuracy of the simulation result is higher.

In an embodiment, as shown in FIG. 6, the parameterization unit further includes a parameter setting unit, and the parameter setting unit is configured to set parameters of the power device and parameters of the layout. Since the parasitic resistance is determined by the layout of the device, before acquiring the parasitic resistance, the layout of the device needs to be determined first. The parameters of the power device and the layout parameters can be set through the parameter setting unit. After setting of the parameters is completed, the simulation tool will automatically generate a corresponding layout, and then the algorithm unit will acquire the relevant parameters of the layout and complete the calculation of the parasitic resistance through the built-in algorithm. In an embodiment, in order to facilitate reading the specific parasitic resistance value, the simulation tool further includes a parameter display interface, which can automatically display the resistance value of the parasitic resistance. Specifically, setting the parameters of the power device includes setting a length and a width of the power device, thereby determining the size of the power device, and setting the layout parameters includes setting the number of fingers and the structure of the metal layers of the power device. The size of a single finger in the layout can be determined according to the size of the device and the number of fingers. The total width of the device=the width of a single finger×the number of fingers. The more the number of fingers, the smaller the width-to-length ratio of the layout, therefore, the width-to-length ratio of the layout can be adjusted through a parameter setting unit.

The technical features of the above-described embodiments may be combined arbitrarily. To simplify the description, not all possible combinations of the technical features in the above embodiments are described. However, all of the combinations of these technical features should be considered as within the scope of this disclosure, as long as such combinations do not contradict with each other.

The above embodiments merely illustrate several embodiments of the present disclosure, and the description thereof is specific and detailed, but it shall not be constructed as limiting the scope of the present disclosure. It should be noted that, for a person of ordinary skill in the art, several variations and improvements may be made without departing from the concept of the present application, and these are all within the protection scope of the present application. Therefore, the protection scope of the present disclosure shall be subject to the appended claims.

What is claimed is:

1. A simulation method for a resistance of a power device, the power device comprising:
   N finger structures, each of the finger structures comprises a source region and a drain region;
   a top metal layer, comprising a source metal strip and a drain metal strip located at a top layer; and
   an intermediate metal layer, comprising a first intermediate layer and a second intermediate layer, wherein the first intermediate layer connects each of the source regions to the source metal strip to lead out a common source, and the second intermediate layer connects each of the drain regions to the drain metal strip to lead out a common drain;

the simulation method for the resistance comprising:

establishing an equivalent resistance model of the power device according to a connection relationship of the N finger structures; wherein, the connection relationship of N fingers is equivalent to a parallel connection of N resistors $R_b$, current input terminals of adjacent resistors $R_b$ are connected to each other through a resistor $R_a$, current output terminals of adjacent resistors $R_b$ are connected to each other through a resistor $R_c$, the source is a current input terminal of a first resistor $R_b$, and the drain is a current output terminal of an Nth resistor $R_b$, $$R_a = \frac{1}{N}R_0, R_c = \frac{1}{N}R_1,$$

$R_b=R_{DEV}*N+R_S+R_D$, wherein, $R_0$ is a resistance of the source metal strip, $R_1$ is a resistance of the drain metal strip, $R_S$ is a metal resistance of the first intermediate layer connecting a source region to the source metal strip, $R_D$ is a metal resistance of the second intermediate layer connecting a drain region to the drain metal strip, and $R_{DEV}$ is a channel resistance of the power device; and calculating a resistance of the equivalent resistance model, the resistance of the power device is the resistance of the equivalent resistance model.

2. The simulation method for the resistance of the power device of claim 1, wherein the intermediate metal layer comprises a first metal layer and a second metal layer, the first metal layer comprises first metal strips and second metal strips, the second metal layer comprises third metal strips and fourth metal strips, the first metal strips are connected to the source regions in a one-to-one correspondence, and the second metal strips are connected to the drain regions in a one-to-one correspondence, the third metal strips and the first metal strips are connected to each other in a one-to-one correspondence and are connected to the source metal strip, the fourth metal strips and the second metal strips are connected to each other in a one-to-one correspondence and are connected to the drain metal strip, the first metal strip and the third metal strip connected to each other constitute one of the first intermediate layers, and the second metal strip and the fourth metal strip connected to each other constitute one of the second intermediate layers, wherein the metal resistance $R_S$ of each of the first intermediate layers is the parallel resistance of the first metal strip and the third metal strip connected to each other, and the metal resistance $R_D$ of each of the second intermediate layers is the parallel resistance of the second metal strip and the fourth metal strip connected to each other.

3. The simulation method for the resistance of the power device of claim 2, wherein the source metal strip and the drain metal strip have a same size, and $R_0=R_1$.

4. The simulation method for the resistance of the power device according of claim 3, wherein the power device comprises three finger structures, and a resistance value of the equivalent resistance model is approximately $$\frac{R_b}{3} + \frac{4R_a}{3}.$$

5. The simulation method for the resistance of the power device of claim 1, wherein the resistance of the power device further comprises a resistance of a source metal lead and a resistance of a drain metal lead.

6. A simulation method for a power device, the power device comprising:

N finger structures, each of the finger structures comprises a source region and a drain region;

a top metal layer, comprising a source metal strip and a drain metal strip located at a top layer; and an intermediate metal layer, comprising a first intermediate layer and a second intermediate layer, wherein the first intermediate layer connects each of the source regions to the source metal strip to lead out a common source, and the second intermediate layer connects each of the drain regions to the drain metal strip to lead out a common drain;

the simulation method for the power device comprising:

step A: acquiring a resistance of the power device, and the method for acquiring the resistance of the power device comprising:

establishing an equivalent resistance model of the power device according to a connection relationship of the finger structures; wherein, the connection relationship of N fingers is equivalent to a parallel connection of N resistors $R_b$, current input terminals of adjacent resistors $R_b$ are connected to each other through a resistor $R_a$, current output terminals of adjacent resistors $R_b$ are connected to each other through a resistor $R_c$, the source is a current input terminal of a first resistor $R_b$, and the drain is a current output terminal of an Nth resistor $R_b$, $$R_a = \frac{1}{N}R_0, R_c = \frac{1}{N}R_1,$$

$R_b=R_{DEV}*N+R_S+R_D$, wherein, $R_0$ is a resistance of the source metal strip, $R_1$ is a resistance of the drain metal strip, $R_S$ is a metal resistance of the first intermediate layer connecting a source region to the source metal strip, $R_D$ is a metal resistance of the second intermediate layer connecting a drain region to the drain metal strip, and $R_{DEV}$ is a channel resistance of the power device; and calculating a resistance of the equivalent resistance model, the resistance of the power device is the resistance of the equivalent resistance model;

step B: reading the resistance of the power device and calculating a parasitic resistance of the power device, wherein the parasitic resistance of the power device is equal to the channel resistance of the power device subtracted from the resistance of the power device; and step C: acquiring the parasitic resistance of the power device and performing pre-simulation on the power device according to the parasitic resistance of the power device.

7. The simulation method of claim 6, further comprising, prior to acquiring the parasitic resistance of the power device, setting parameters of the power device and layout parameters, and generating a layout of the power device, and wherein the acquiring the resistance of the power device specifically comprises: acquiring the resistance of the power device under the current layout.

8. The simulation method of claim 7, wherein, setting the parameters of the power device comprises setting a length and a width of the power device; and setting the layout parameters comprises setting a number of fingers of the power device and setting the metal layers.

9. The simulation method of claim 6, further comprising: after acquiring the parasitic resistance of the power device, displaying the parasitic resistance on a parameter display interface.

10. The simulation method of claim 6, wherein a simulation tool of the simulation method is a spectre simulation tool, and the acquiring the parasitic resistance of the power device specifically comprises writing the parasitic resistance into a spectre netlist to perform pre-simulation.

11. The simulation method of claim 6, further comprising, prior to the simulation, determining the power device, and when a total channel width of the power device is greater than 5 mm or the channel impedance of the power device is less than 500 mΩ, using the simulation method to perform simulation on the power device.

12. A simulation tool, configured to perform simulation on a power device, the power device comprising:
N finger structures, each of the finger structures comprises a source region and a drain region;
a top metal layer, comprising a source metal strip and a drain metal strip located at a top layer; and
an intermediate metal layer, comprising a first intermediate layer and a second intermediate layer, wherein the first intermediate layer connects each of the source regions to the source metal strip to lead out a common source, and the second intermediate layer connects each of the drain regions to the drain metal strip to lead out a common drain;
the simulation tool comprising:
a parameterization unit, comprising an algorithm unit, the algorithm unit being configured to establish an equivalent resistance model of the power device according to a connection relationship of the N finger structures, wherein, the connection relationship of N fingers is equivalent to a parallel connection of N resistors $R_b$, current input terminals of adjacent resistors $R_b$ are connected to each other through a resistor $R_a$, current output terminals of adjacent resistors $R_b$ are connected to each other through a resistor $R_c$, the source is a current input terminal of a first resistor $R_b$, and the drain is a current output terminal of an Nth resistor $R_b$, $$R_a = \frac{1}{N}R_0, R_c = \frac{1}{N}R_1,$$

$R_b = R_{DEV}*N + R_S + R_D$, wherein, $R_0$ is a resistance of the source metal strip, $R_1$ is a resistance of the drain metal strip, $R_S$ is a metal resistance of the first intermediate layer connecting a source region to the source metal strip, $R_D$ is a metal resistance of the second intermediate layer connecting a drain region to the drain metal strip, and $R_{DEV}$ is a channel resistance of the power device; and the algorithm unit being further configured to calculate a resistance of the equivalent resistance model, the resistance of the power device is the resistance of the equivalent resistance model and a parasitic resistance of the power device is acquired according to the resistance of the power device, wherein the parasitic resistance of the power device is equal to the channel resistance of the power device subtracted from the resistance of the power device; and
a pre-simulation unit, configured to read the parasitic resistance of the power device and perform pre-simulation on the power device according to the parasitic resistance.

13. The simulation tool of claim 12, wherein the parameterization unit further comprises a parameter setting unit, and the parameter setting unit is configured to set parameters of the power device and layout parameters.

14. The simulation tool of claim 12, further comprising a parameter display interface configured to display the parasitic resistance.

15. The simulation tool of claim 12, wherein the pre-simulation unit comprises a spectre netlist, and the reading the parasitic resistance of the power device specifically comprises writing the parasitic resistance into the spectre netlist of pre-simulation.

* * * * *